(12) United States Patent  (10) Patent No.: US 7,643,391 B2
Aikoh et al.  (45) Date of Patent: Jan. 5, 2010

(54) OPTICAL HEAD, OPTICAL-INFORMATION MEDIUM DRIVING DEVICE, AND SENSOR

(75) Inventors: Hideki Aikoh, Higashiosaka (JP); Takao Hayashi, Toyonaka (JP); Tohru Nakamura, Katano (JP)

(73) Assignee: Panasonic Corporation, Osaka (JP)

( * ) Notice: Subject to any disclaimer, the term of this patent is extended or adjusted under 35 U.S.C. 154(b) by 625 days.

(21) Appl. No.: 10/919,239

(22) Filed: Aug. 17, 2004

(65) Prior Publication Data

US 2005/0041550 A1  Feb. 24, 2005

(30) Foreign Application Priority Data

Aug. 18, 2003  (JP) ............... 2003-294295

(51) Int. Cl.
    *G11B 7/00*  (2006.01)
(52) U.S. Cl. .............. 369/53.19; 369/44.12; 369/44.32; 369/120
(58) Field of Classification Search ....................... None
    See application file for complete search history.

(56) References Cited

U.S. PATENT DOCUMENTS

| 5,608,695 | A | * | 3/1997 | Yamazaki | ................ | 369/44.12 |
| 5,699,340 | A | | 12/1997 | Lee et al. | | |
| 6,249,498 | B1 | * | 6/2001 | Miyanabe et al. | ........ | 369/53.19 |
| 2002/0048243 | A1 | * | 4/2002 | Yanagisawa et al. | ..... | 369/53.19 |

FOREIGN PATENT DOCUMENTS

| JP | 63-86123 | 4/1988 |
| JP | 6-259796 | 9/1994 |
| JP | 7-82657 | 9/1995 |
| JP | 9-73648 | 3/1997 |

OTHER PUBLICATIONS

Japanese Office Action (with English translation) issued Apr. 28, 2009 in Japanese Application No. 2004- 216434.

* cited by examiner

*Primary Examiner*—Thang V Tran
*Assistant Examiner*—Joseph Haley
(74) *Attorney, Agent, or Firm*—Wenderoth, Lind & Ponack, L.L.P.

(57) ABSTRACT

When the tilt of an optical disk is detected using a light source of an optical head, the optical head cannot be simplified enough and an optical-disk tilt cannot be detected adequately. The optical head includes: an LED chip; a light-converging element that converges the light which is emitted from the LED chip upon an optical disk; a light-converging element driving means which drives the light-converging element; and a sensor which detects a tilt or a positional shift of the optical disk. In the sensor, the LED chip is placed on a semiconductor substrate which is provided with a plurality of light-receiving chips; the light emitted from the LED chip irradiates the optical disk; the light which is reflected from the optical disk is received by the plurality of light-receiving chips; and based upon the quantity of light which is received at the plurality of light-receiving chips, a tilt or a positional shift of the optical disk is detected.

9 Claims, 15 Drawing Sheets

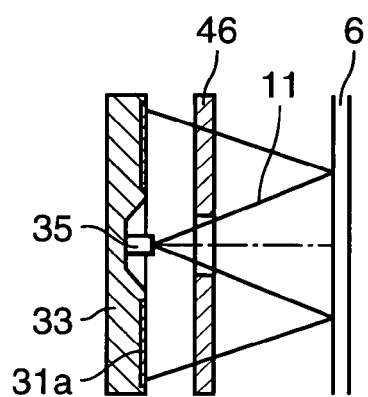
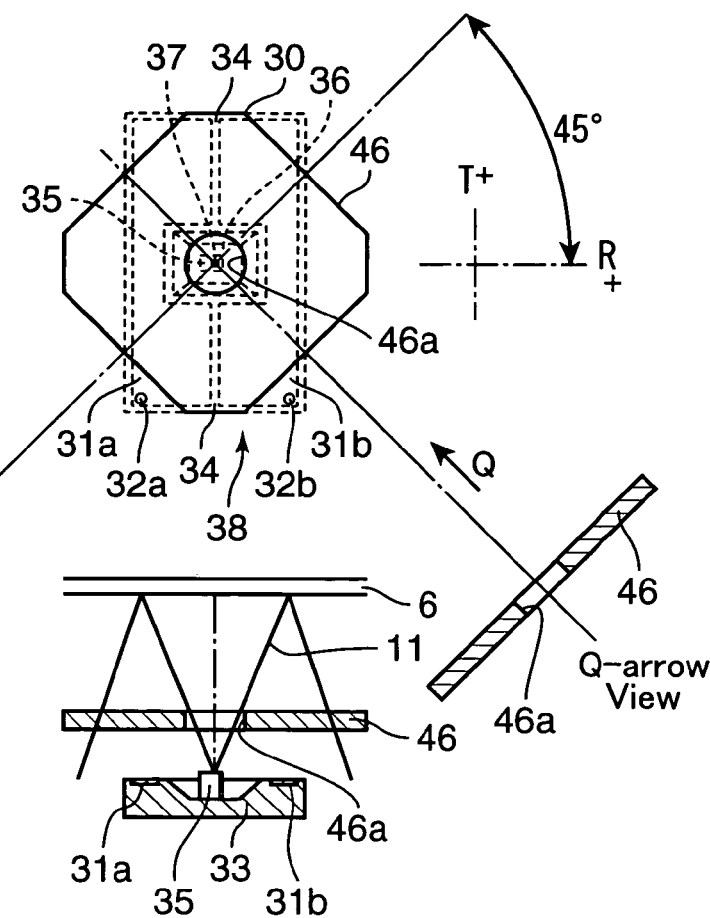
FIG.7B  FIG.7A
FIG.7C

FIG.11
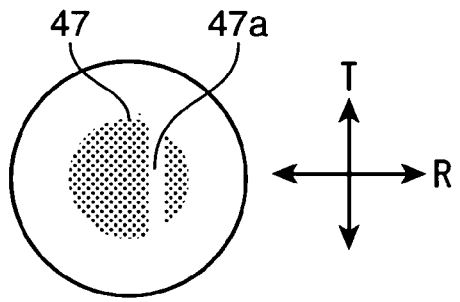
FIG.12A   FIG.12B   FIG.12C
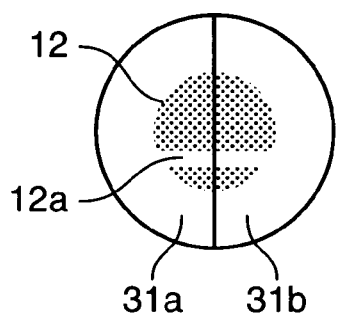 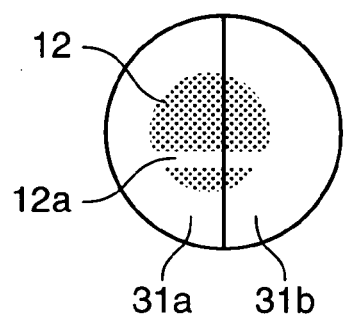 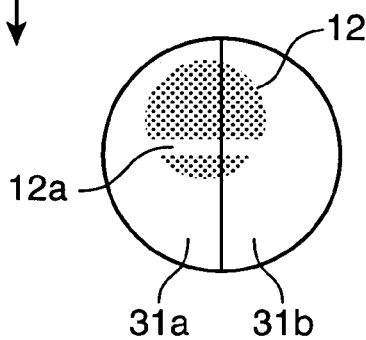
FIG.13
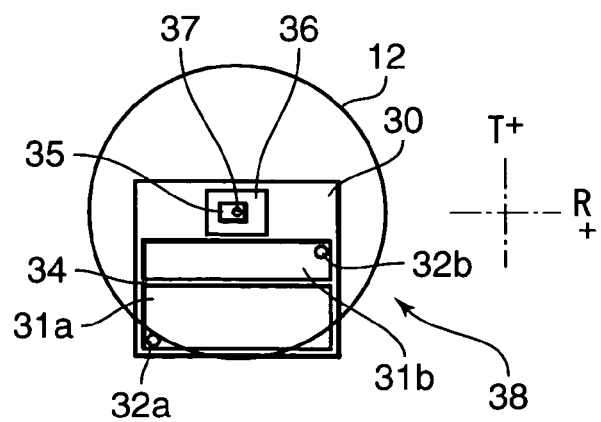

OPTICAL HEAD, OPTICAL-INFORMATION MEDIUM DRIVING DEVICE, AND SENSOR

BACKGROUND OF THE INVENTION

1. Field of the Invention

The present invention relates to an optical head, an optical-information medium driving device and a sensor. Specifically, the present invention relates to a small sensor which detects the tilt or position of an optical information medium, an optical head and an optical-information medium driving device which are provided with this sensor, a sensor which detects the tilt or position of an optical component which needs to be displaced among the component parts of an optical head, and an optical head and an optical-information medium driving device which are provided with this sensor.

2. Description of the Related Art

In today's advanced IT society, technological development has been flourishing for a high-density and large-capacity memory. As capabilities required for such a memory, there are mentioned a high density, a large capacity and high reliability, as well as a rewriting function and the like. As one of those that can satisfy these demands, an optical disk is well known in which information is optically recorded and regenerated, using an optical head. With respect to an optical head, a great number of reports have conventionally been made on the art of detecting the tilt of an optical disk. For example, examined application publication No. 7-82657 describes how to resolve disadvantages in that if an LED (or light emitting diode) and a pair of photo-detectors is provided, costs for an optical head will become higher and its size will be difficult to make smaller.

FIG. 18 describes a configuration of the optical head according to the mentioned examined application publication. Its configuration and operation will be described below.

In FIG. 18, reference numeral 1 denotes a semiconductor laser which is a light source (hereinafter, referred to as the LD); 2, a luminous flux which is emitted from the LD 1; 4, a beam splitter as a splitting means which splits the luminous flux reflected by an optical disk 6 from the emitted luminous flux; 7, an aperture restricting means which restricts an aperture for a luminous flux that is incident upon an objective lens 5 which is used as a converging means; 9, a light spot at which the luminous flux 2 emitted from the LD 1 is converged on an information recording surface of the optical disk 6; 10, a light detector which receives the luminous flux that has been reflected by the optical disk 6 and has passed through the objective lens 5 and the beam splitter 4, and conducts its photoelectric conversion; 40, an optical axis of the objective lens 5; 8, an unnecessary luminous flux except for the effective luminous flux 2 of a luminous flux emitted from the LD 1 which passes through the aperture restricting means 7 and is incident on the objective lens 5 (i.e., a luminous flux for tilt detection, or a luminous flux which is used to detect a tilt of the optical disk 6); 17, a light spot at which the unnecessary luminous flux 8 is converged on the information recording surface of the optical disk 6; 14, a light detector for tilt detection as a second detecting means which receives the luminous flux of the unnecessary luminous flux 8 which is reflected from the optical disk 6; and 90, a reflecting mirror as a travelling-direction changing means which changes the direction in which a part of the unnecessary luminous flux 8 travels so that it is incident upon the objective lens 5 through the aperture restricting means 7. The above described tilt-detection light detector 14 includes two detection areas 14a, 14b. An output from each area 14a, 14b is given to a subtracter 15. This tilt-detection light detector 14 outputs an angle at which the optical axis of the objective lens 5 crosses the information recording surface of the optical disk 6. In other words, it is used to detect a tilt of the optical disk 6.

In FIG. 18, an operation will be described for detecting a tilt of the optical disk 6. The effective luminous flux 2 is determined by the aperture restricting means 7, and is the luminous flux which diverges from the LD 1 and is used for recording and regeneration in the optical disk 6. With respect to the unnecessary luminous flux 8 other than that, the direction in which a part of it travels is changed by the reflecting mirror 90. Then, it passes through the aperture restricting means 7 and reaches the convergent light spot 17 on the optical disk 6 through the objective lens 5. The convergent light spot 17 is irradiated which is a position different from that of the convergent light spot 9 for recording and regeneration. The luminous flux which is reflected from each convergent light spot 9, 17 on the optical disk 6 forms an image in a different position. Then, it is received by the light detector 10 and the light detector 14, respectively. The light detector 14 is used for tilt (i.e., the tilt of an optical disk) detection and is a light detector which is divided in the two detection areas 14a, 14b. The light detector 14 is placed so that if the optical disk 6 is perpendicular to the optical axis of the objective lens 5, the quantity of the tilt-detection luminous flux 8 which is received from the convergent light spot 17 becomes equal at the detection area 14a and at the detection area 14b. In FIG. 18, the radius direction of the optical disk 6 is along the X-axis. If the rotational axis of the optical disk 6 tilts with respect to the Y-axis (i.e., around the Y-axis), the tilt-detection luminous flux 8 moves toward the +X-directions on the light detector 14. Then, the difference between the quantity of the light received by the detection area 14a and the quantity of the light received by the detection area 14b are obtained by executing the following arithmetical processing: (the receiving-light quantity of the detection area 14a)–(the receiving-light quantity of the detection area 14b). Thereby, the tilt of the optical disk 6 can be detected. This tilt information is outputted as a tilt signal VTILT from the subtracter 15. Hence, a luminous flux for tilt detection can be obtained only by providing the reflecting mirror 90 in the unnecessary luminous flux of the LD1 which is not in common use. In short, there is no need to use a separate light source such as an LED.

Herein, none of the components which are not based upon the purport of the present invention are shown in the figure, and their description is omitted. They include an optical head, and other components that configure an optical-information medium driving device which this optical head is applied to, such as an actuator, a motor, a circuit and a mechanism.

However, the configuration of the above-mentioned examined application publication has the following disadvantages. According to the configuration shown in FIG. 18, a luminous flux for tilt detection is obtained without using a separate light source such as an LED. This helps make an optical head smaller by its volume. But, the publication is configured such that the light detector 14 forms an image of the tilt-detection luminous flux 8 at the convergent light spot 17 and receives it. This requires the light detector 14 to sit near the light detector 10. As a result, an additional volume has to be secured from the aspect of the configuration of an optical head. Furthermore, the unnecessary luminous flux 8 of the LD1 is used, and thereby, the quantity of a luminous flux for tilt detection, or the degree to which it diverges, varies according to the peculiarity of an LD1. Consequently, the performance of detecting a tilt (i.e., the tilt of an optical disk) also becomes uneven. Moreover, when the position of the light detector 14 is adjusted, it forms an image at the convergent light spot 17 and receives it. At that time, the receiving-light quantity of the detection area 14a has to be equated with that of the detection area 14b. Hence, it is necessary to adjust the light detector 14 extremely precisely. In addition, the temperature near the LD1 goes up to become higher than any other place in an optical head. This rise in temperature may change the position or direction of the unnecessary luminous flux 8 from the LD1. Thus, the performance of detecting a tilt (i.e., the tilt of an optical disk) may decrease, thereby causing an error. In sum, the fact that there is no need for a separate light source such as an LED presents advantages in that the optical head can be made smaller and its costs can be lowered. However, there are disadvantages in that it cannot be made simple enough and an adequate performance of detecting a tilt (i.e., the tilt of an optical disk) cannot be obtained.

On the other hand, a so-called tilt sensor is also in practical use, which is formed by uniting an LED as a separate light source with a light-receiving element. However, such a tilt sensor has a size of, for example, about 7 mm×7 mm, and 9 mm in height. This makes it difficult to place it in a small optical head.

SUMMARY OF THE INVENTION

Therefore, it is an object of the present invention to provide a simple and small sensor which is capable of sufficiently detecting the tilt of an optical disk, or the positional shift of an optical component or the like, and in addition, to provide an optical head and an optical-information medium driving device which include this sensor.

In order to attain the above described object, an optical head according to the present invention which converges, on an optical information medium, a beam of light for information recording or regeneration which is emitted from a laser light source, and receives the beam of light which is reflected from the optical information medium, comprises, a sensor which detects a tilt or a positional shift of the optical information medium from a predetermined reference, the sensor including: a substrate; a light-source chip element which is disposed on the substrate; and a light-receiving region which is disposed on the substrate and receives a beam of light emitted from the light-source chip element after reflected by the optical information medium, wherein the light-receiving region is divided into a plurality of areas, and based on the ratio of the quantity of light which each area receives, detects a tilt or a positional shift of the optical information medium.

Furthermore, an optical head according to the present invention which converges, on an optical information medium, a beam of light for information recording or regeneration which is emitted from a laser light source after the beam of light passes through a predetermined optical component, and receives the beam of light which is reflected from the optical information medium, comprises, a sensor which detects a tilt or a positional shift of the optical component from a predetermined reference, the sensor including: a substrate; a light-source chip element which is disposed on the substrate; and a light-receiving region which is disposed on the substrate and receives a beam of light emitted from the light-source chip element after the beam of light is reflected by the optical component or a holding member which holds the optical component, wherein the light-receiving region is divided into a plurality of areas, and based on the ratio of the quantity of light which each area receives, detects a tilt or a positional shift of the optical component.

Moreover, an optical head according to the present invention which converges, on an optical information medium, a beam of light for information recording or regeneration which is emitted from a laser light source after the beam of light passes through a predetermined optical component, and receives the beam of light which is reflected from the optical information medium, comprises, a sensor which detects a tilt or a positional shift of the optical component from a predetermined reference, the sensor including: a substrate; a light-source chip element which is disposed on the substrate; and a light-receiving region which is disposed on the substrate and receives a beam of light emitted from the light-source chip element after the beam of light is reflected by the optical component or a holding member which holds the optical component, wherein in the optical component or the holding member which holds the optical component, a reflection region which reflects a beam of light emitted from the light-source chip element is formed by a plurality of areas which each have a different reflectance ratio, and a tilt or a positional shift of the optical component is detected based on the quantity of light which is reflected by the reflection region and is received by the light-receiving region.

Furthermore, the above described optical head may also be configured such that a concave portion is formed in the surface of the substrate; and the light-source chip element is disposed in the concave portion.

Furthermore, the concave portion may also have a taper shape at the side surface thereof.

Furthermore, preferably, the light-source chip element should be an LED element.

Furthermore, the above described optical head may also be configured such that the substrate is made of a semiconductor; and the light-source chip element is united with the substrate.

Furthermore, the above described optical head may also be configured such that in the substrate, a circuit portion is provided which amplifies a photoelectric current from the light-receiving region and makes a calculation.

Furthermore, the above described optical head may also be configured such that the optical information medium has a disk shape; a cylindrical element is provided on an optical path between the optical information medium and the light-receiving region; the light-receiving region is divided along a division line as a boundary which extends in the directions parallel to the diametrical directions of the optical information medium; and the cylindrical element is placed so that the bus line thereof tilts from the division line.

Moreover, an optical-information medium driving device may also be used, which comprises the above described optical head, and records information in an optical information medium or regenerates information recorded therein.

In addition, a sensor according to the present invention which detects a tilt or a positional shift of an object from a predetermined reference, comprises: a substrate; a light-source chip element which is disposed on the substrate; and a light-receiving region which is disposed on the substrate and receives a beam of light emitted from the light-source chip element after reflected by the object, wherein the light-receiving region is divided into a plurality of areas, and based on the ratio of the quantity of light which each area receives, detects a tilt or a positional shift of the object.

Furthermore, a sensor according to the present invention which detects a tilt or a positional shift of an object from a predetermined reference, comprises: a substrate; a light-source chip element which is disposed on the substrate; and a light-receiving region which is disposed on the substrate and receives a beam of light emitted from the light-source chip element after reflected by the object, wherein in the object, a reflection region which reflects a beam of light emitted from the light-source chip element is formed by a plurality of areas which each have a different reflectance ratio, and a tilt or a positional shift of the object is detected based on the quantity of light which is reflected by the reflection region and is received by the light-receiving region.

As described hereinbefore, in the optical head according to the present invention, the sensor is provided on its substrate with the light-receiving region which is divided into a plurality of areas and the light-source chip element. The sensor receives, at the plurality of areas, the light which is reflected from the optical information medium. Then, based on the quantity of the light which the sensor has received at the plurality of areas, it detects the tilt or positional shift of the optical information medium. Therefore, a simple sensor, which is capable of sufficiently detecting the tilt or positional shift of an optical information medium, can be put in a position where the shape of an optical head itself is prevented from being affected, without adjusting the position precisely. Besides, using a light-source chip element which is separate from a laser light source, a tilt or the like is detected, thereby narrowing its dispersion. This also keeps under control a change in the position or direction of a luminous flux from the light-source chip element which may be caused by a change in temperature. Overall, a small and low-cost optical head can be realized.

Furthermore, in the optical head according to another aspect of the present invention, the sensor is provided on its substrate with the light-receiving region which is divided into a plurality of areas and the light-source chip element. The sensor receives, at the plurality of areas, the light which is reflected from an optical component or a holding member which holds this. Then, based on the quantity of the light which the sensor has received at the plurality of areas, it detects the tilt or position of the optical component. Therefore, in the optical head, based on the detected information, a driving means can execute detailed control of the optical component whose tilt or position should be changed. For example, a spherical aberration which is caused by the thickness of an optical disk can be corrected by controlling the position of an optical component in the optical head.

Moreover, in the optical head according to still another aspect of the present invention, the sensor is provided on its substrate with the light-receiving region which receives the light which has been reflected by the reflection region that is formed by a plurality of areas which each have a different reflectance ratio, and the light-source chip element. Hence, there is no need to divide the light-receiving region of the sensor into a plurality of areas. This makes an optical head smaller and makes it possible to control the position of an optical component in detail.

Furthermore, in the case where a concave portion is formed in the substrate provided with the light-receiving region, and the light-source chip element is disposed in the concave portion, the light emitted from the light-source chip element is applied to the optical information medium. Then, the reflected light is incident upon the light-receiving region, so that the tilt or position of the optical information medium is detected. Therefore, this sensor is capable of sufficiently detecting the tilt or position of an optical information medium, though its configuration is simple. Besides, it allows the unnecessary light of the light-source chip element to reach the side-surface part of the concave portion, thus improving its detection performance as a sensor. In addition, the light-source chip element is kept from protruding from the substrate, thereby realizing a small sensor which is easy to handle as a single component. Moreover, the side surface of the concave portion is tapered, and thus, a light-source chip can be placed more easily than in the case where the concave portion has a perpendicular side surface. Such a configuration also facilitates the formation of a substrate and makes it easier to diffuse heat in the air.

Furthermore, in the case where the light-source chip element is an LED element, it is easily fixed on the substrate and emits light steadily. This realizes a simple and small sensor which is capable of sufficiently detecting the tilt or position of an optical information medium.

Furthermore, in the case where the substrate is made of a semiconductor, the light-source chip element is united with the substrate, for example, in processing steps. Therefore, when a separate light-source chip element is placed on the substrate, an error can be prevented from being made in its position and angle on the surface of the substrate. This keeps under control the inclination of the optical axis of a luminous flux, or the dispersion of the position where it emits light. Besides, the area of the concave portion necessary for placing a light-source chip element becomes smaller. This makes it possible to make the area of a light-receiving chip larger. Therefore, an optical head can be realized which is capable of detecting the tilt or position of an optical information medium more precisely.

Furthermore, in the case where a circuit portion which amplifies a photoelectric current from the light-receiving region and makes a calculation is provided in the substrate, the output of the sensor becomes more stable. This realizes a simple and small sensor which is capable of sufficiently detecting the tilt or position of an optical information medium.

Furthermore, in the case where the light reflected from the optical information medium passes through a cylindrical element and is incident upon the light-receiving region, even though the sensor has a simple configuration, it can sufficiently detect the tilt or position of an optical information medium. Even if an optical information medium, or an optical disk, is used whose recorded part has a reflectance ratio different from that of its not-yet recorded part, the different reflectance ratio cannot affect its performance. Therefore, a small sensor can be realized which is capable of steadily detecting the tilt or position of an optical information medium.

Moreover, the optical head according to the present invention is configured by: a laser light source; a light-converging element driving mechanism; and a light-receiving element which receives a signal reflected light from an optical information medium, and it is provided with the above described sensor. Therefore, an optical head can be realized which includes a simple and small sensor that is capable of sufficiently detecting the tilt or position of a component of the optical head, for example, the light-converging element driving mechanism.

In addition, in the sensor according to the present invention, the light-receiving region is divided into a plurality of areas, and based on the ratio of the quantity of light which each area receives, it detects a tilt or a positional shift of the object. Therefore, a simple and small sensor can be realized which is capable of sufficiently detecting the tilt or positional shift of the object.

Furthermore, the sensor according to another aspect of the present invention includes on the substrate: the light-receiving region which receives the light reflected by the reflection region formed by a plurality of areas which each have a different reflectance ratio; and the light-source chip element. Therefore, without dividing the light-receiving region, the tilt or positional shift of the object can be detected. This realizes a simple and small sensor.

These and other objects, features and advantages of the present invention will become more apparent upon reading of the following detailed description along with the accompanied drawings.

BRIEF DESCRIPTION OF THE DRAWINGS

FIG. 7A is a plan view of a tilt sensor in an optical head according to the fifth embodiment of the present invention, showing its cylindrical element disposition. FIG. 7B is a side sectional view of the tilt sensor in an optical head according to the fifth embodiment of the present invention, showing its cylindrical element disposition. FIG. 7C is a front sectional view of the tilt sensor in an optical head according to the fifth embodiment of the present invention, showing its cylindrical element disposition.

FIG. 11 is a representation, showing an irradiation luminous flux on an optical disk according to the fifth embodiment of the present invention.

FIG. 12A is a representation, showing the distribution of a luminous flux on the sensor according to the fifth embodiment of the present invention, at the time when an optical disk has no tilt. FIG. 12B is a representation, showing the distribution of a luminous flux on the sensor according to the fifth embodiment of the present invention, at the time when the optical disk has a tilt. FIG. 12C is a representation, showing the distribution of a luminous flux on the sensor according to the fifth embodiment of the present invention, at the time when the optical disk has a tilt.

FIG. 13 is a plan view of a sensor which detects the positional shift of an optical disk from an optical head according to the sixth embodiment of the present invention.

DETAILED DESCRIPTION OF THE INVENTION

Hereinafter, the most desirable embodiments for implementing the present invention will be described in detail with reference to the drawings.

First Embodiment

Figure 1B:
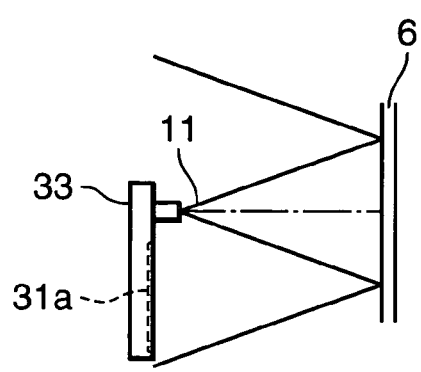
FIG. 1B is a side view of the tilt sensor in the optical head according to the first embodiment of the present invention.
Figure 1A:
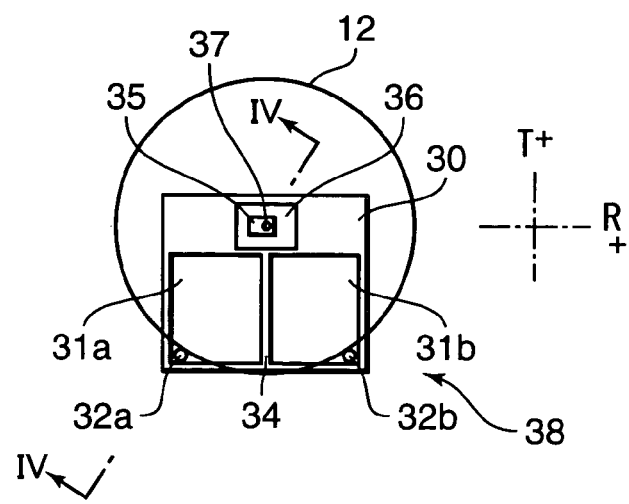
FIG. 1A is a plan view of a tilt sensor in an optical head according to the first embodiment of the present invention.
Figure 1C:
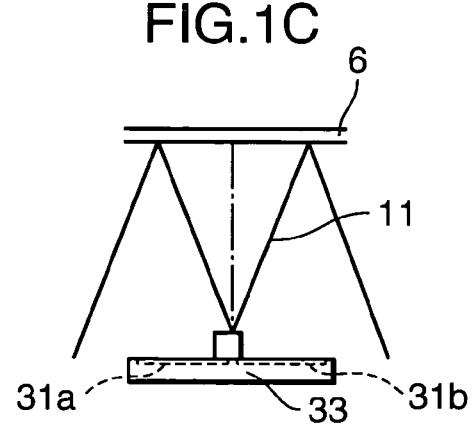
FIG. 1C is a front view of the tilt sensor in the optical head according to the first embodiment of the present invention.
Figures 2A, 2B:
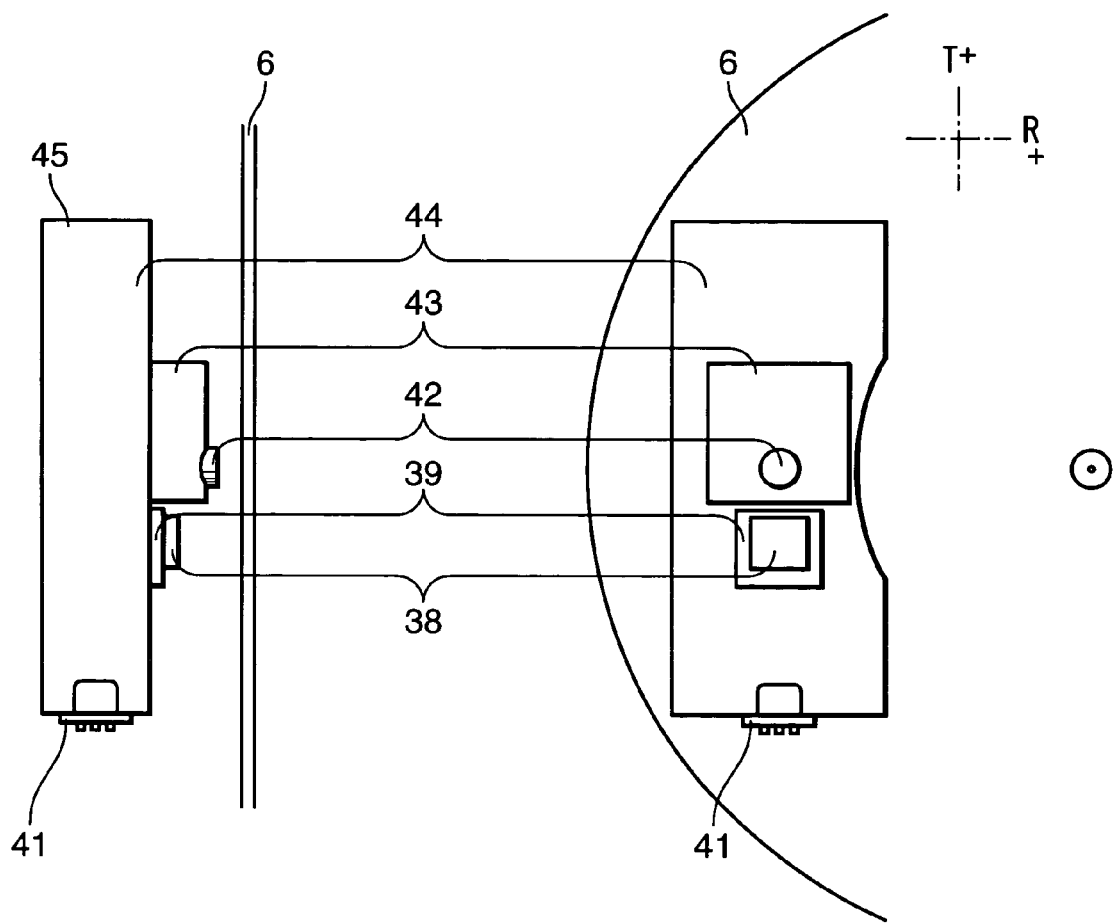
FIG. 2A is a plan view of the optical head according to the first embodiment of the present invention.
FIG. 2B is a side view of the optical head according to the first embodiment of the present invention.
Figure 2C:
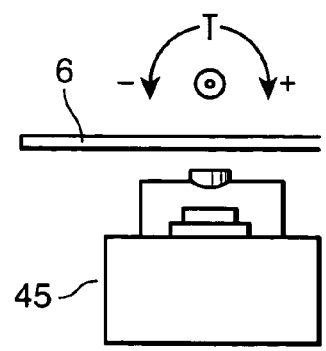
FIG. 2C is a front view of the optical head according to the first embodiment of the present invention.

FIG. 1A, FIG. 1B and FIG. 1C are a plan view, a side view and a front view of a tilt sensor according to the first embodiment of the present invention. These figures show a schematic configuration of the tilt sensor. FIG. 2A, FIG. 2B and FIG. 2C are a plan view, a side view and a front view of an optical head which is provided on it with the tilt sensor. These figures show a schematic configuration of the optical head. Their configurations and functions are described below.

In FIG. 1A, FIG. 1B and FIG. 1C, and FIG. 2A, FIG. 2B and FIG. 2C, reference numeral 6 denotes an optical disk as an example of the optical information medium which is a reflecting body. A tilt sensor 38 includes a semiconductor substrate 30 which has a rectangular shape in plan view and a thickness of 0.3 mm. The semiconductor substrate 30 is disposed in a position apart from the optical disk 6 by 3 mm. The semiconductor substrate 30 is a substrate which is made of a semiconductor, such as silicon, GaAsP (gallium-arsenic-phosphorus), Ge (germanium) and InGaAs (indium-gallium-arsenic). The semiconductor substrate 30 is provided with a light-receiving chip as an example of the light-receiving region. According to this embodiment, the light-receiving chip is divided into two areas (i.e., a first light-receiving chip 31a and a second light-receiving chip 31b). The first light-receiving chip 31a and the second light-receiving chip 31b are formed by dividing the light-receiving chip along a division line 34 as a boundary which extends straight. Each light-receiving chip 31a, 31b is made of a semiconductor (whose structure is not described in detail) which has a size of 1.2 mm×1.5 mm. In other words, both light-receiving chips 31a, 31b are symmetrical with respect to the division line 34.

The first light-receiving chip 31a is provided with a first electrode 32a, and the second light-receiving chip 31b is provided with a second electrode 32b. The semiconductor substrate 30 is provided with a third electrode 33 which operates in common on both light-receiving chips 31a, 31b.

The semiconductor substrate 30 is provided as an example of the light-source chip element with an LED chip 35. This LED chip 35 is 0.31 mm×0.21 mm, and 0.35 mm high. The LED chip 35 is placed so that a light-emitting point 37 is located on the extension line of the division line 34. The LED chip 35 is disposed in the semiconductor substrate 30, via a fourth electrode 36. Herein, in FIG. 1B, reference numeral 11 designates a luminous flux which is emitted from the LED chip 35, and in FIG. 1A, 12 denotes a luminous flux which is reflected by the optical disk 6.

The sensor 38 is configured by the above described components. According to such a configuration, the sensor 38 is 2.7 mm×2.4 mm, and has a height of 0.65 mm. According to this embodiment, this sensor is used as the tilt sensor 38 which detects the tilt of the optical disk 6, and thus, its description is given using such an example.

In FIG. 2A, reference numeral 39 designates a distribution board which is electrically connected to the tilt sensor 38. Herein, electrically connecting the tilt sensor 38 to the distribution board 39 means the third electrode 33 is connected and fixed to the wiring on the distribution board 39 by soldering, and that the first electrode 32a, the second electrode 32b, the LED chip 35 and the fourth electrode 36 are each connected and fixed to the wiring on the distribution board 39 by wire bonding using a metal wire (not shown).

In FIG. 2A and FIG. 2B, reference numeral 42 denotes an objective lens which is a light-converging element; 43, an actuator as the light-converging element driving mechanism which drives the objective lens 42; 41, a semiconductor laser as the laser light source; and 44, an optical block which allows the light which is emitted from the semiconductor laser 41 to reach the objective lens 42, and that includes optical elements which detect an information signal of the optical disk 6. The above described components configure an optical head 45 which includes the tilt sensor 38.

Herein, a direction R is the radius direction of the optical disk 6, and a direction T is the tangential direction of the optical disk 6. The tilt sensor 38 is placed so that the division line 34 becomes substantially parallel with the direction T.

Operations will be described of the tilt sensor 38 and the optical disk which includes the tilt sensor 38 according to the first embodiment of the present invention which are configured as described above.

First, an electric current is sent to the LED chip 35 which is connected to an external circuit (not shown) via the distribution board 39. The LED chip 35 is luminous and emits divergent light, as shown in FIG. 1B and FIG. 1C. A luminous flux 11 which has been emitted like this is incident on the optical disk 6 and is reflected by it. A luminous flux 12 which has been reflected in this way is incident upon the tilt sensor 38, for example, with such a size as shown in FIG. 1A. The luminous flux 11 which has been emitted from the LED chip 35 is applied directly to the optical disk 6, without passing through an optical component or the like. The reflected luminous flux 12 is also incident directly on the light-receiving chips 31a, 31b, without passing through an optical component or the like. Herein, the tilt sensor 38 is positioned so that the quantity of light which each of the light-receiving chip 31a and the light-receiving chip 31b receives becomes equal at the time when the optical disk 6 has no relative tilt with respect to a predetermined reference of the optical head 45.

Both light-receiving chips 31a, 31b are electrically connected via the third electrode 33 to the wiring of the distribution board 39. The first electrode 32a and the second electrode 32b are each electrically connected via a metal wire to the wiring of the distribution board 39. Therefore, based on the quantity of light which has been received at each light-receiving chip 31a, 31b, a photoelectric current is outputted to the wiring. The light-receiving chips 31a, 31b function as what is called a photodiode which is divided in two.

Figure 3A:
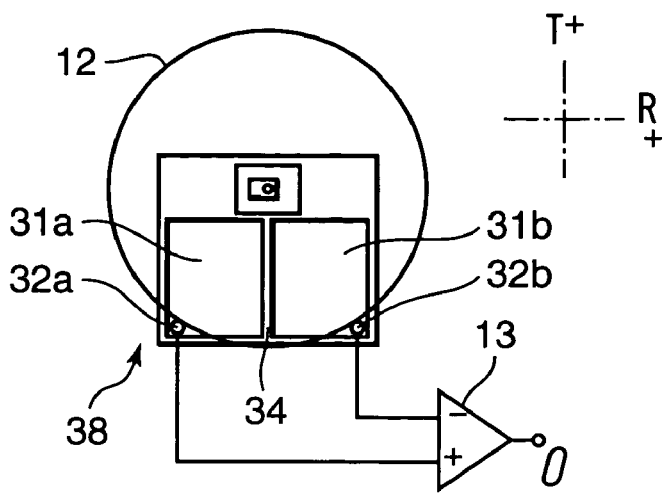
FIG. 3A is a plan view of the tilt sensor according to the first embodiment of the present invention, showing its relation with a reflected luminous flux at the time when it has no relative tilt in the directions of R.
Figure 3B:
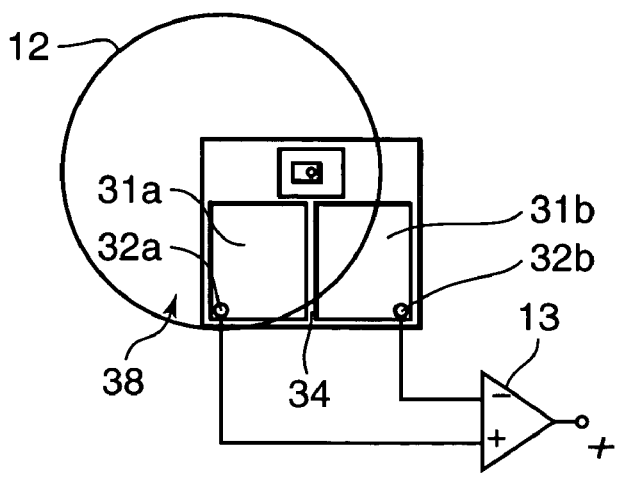
FIG. 3B is a plan view of the tilt sensor according to the first embodiment of the present invention, showing its relation with a reflected luminous flux at the time when it has a relative tilt in the direction of R+.
Figure 3C:
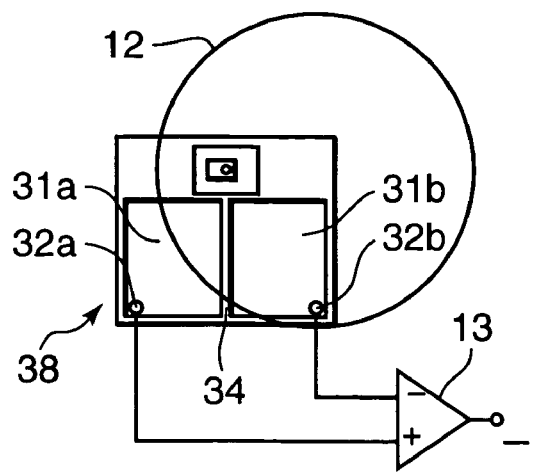
FIG. 3C is a plan view of the tilt sensor according to the first embodiment of the present invention, showing its relation with a reflected luminous flux at the time when it has a relative tilt in the direction of R−.

The function of the tilt sensor 38 will be described with reference to FIG. 3A, FIG. 3B and FIG. 3C. FIG. 3A, FIG. 3B and FIG. 3C show the relation between the tilt sensor 38 and the reflected luminous flux 12. In these figures, for the sake of convenience, the distribution board 39 and its wiring are not shown. Instead, the figures show that a photoelectric current which is generated at the light-receiving chips 31a, 31b is inputted in a differential circuit 13 as an example of the circuit portion, using a signal line from the first electrode 32a and the second electrode 32b.

FIG. 3A shows a state in which the optical disk 6 has no relative tilt in the directions of R (i.e., around the axis in the directions of T) with respect to the optical head 45 in FIG. 2C. In this state, the reflected luminous flux 12 are symmetrical with respect to the division line 34. Therefore, the quantity of light which each light-receiving chip 31a, 31b receives is equal to each other, and the photoelectric current which is generated from each of the first electrode 32a and the second electrode 32b is also the same. As a result, the R-tilt signal of the differential circuit 13 becomes "0".

FIG. 3B shows a state in which the optical disk 6 has a relative tilt in the direction of "+" of the R-directions (i.e., around the axis in the T-directions) shown in FIG. 2C, with respect to the optical head 45. In this state, the reflected luminous flux 12 shifts to the side of the first light-receiving chip 31a with respect to the division line 34. Therefore, the receiving-light quantity of the first light-receiving chip 31a becomes greater than the receiving-light quantity of the second light-receiving chip 31b, and the photoelectric current from the first electrode 32a becomes larger than the photoelectric current from the second electrode 32b. Consequently, the R-tilt signal of the differential circuit 13 becomes "+".

FIG. 3C shows a state in which the optical disk 6 has a relative tilt in the direction of "−" of the R-directions (i.e., around the axis in the T-directions), with respect to the optical head 45. In this state, the reflected luminous flux 12 shifts to the side of the second light-receiving chip 31b with respect to the division line 34. Therefore, the receiving-light quantity of the first light-receiving chip 31a becomes smaller than the receiving-light quantity of the second light-receiving chip 31b, and the photoelectric current from the first electrode 32a becomes smaller than the photoelectric current from the second electrode 32b. Thereby, the R-tilt signal of the differential circuit 13 becomes "−".

In this way, the tilt sensor 38 can output an R-tilt signal according to the relative tilt of the optical disk 6 in the R-directions (i.e., around the axis in the T-directions) with respect to the optical head 45. In other words, the tilt sensor 38 can detect the relative tilt between the optical head 45 and the optical disk 6 in the R-directions (i.e., around the axis in the T-directions).

The configuration according to this embodiment has two features, as described in the following. One of the features is that if a relative tilt is given between the optical head 45 and the optical disk 6 in the T-directions (i.e., around the axis in the R-directions), the reflected luminous flux 12 only shifts in the T-directions, or along the division line 34. Thus, the R-tilt signal remains unchanged, as long as automatic gain control is in operation. The other of the features is that if the optical disk 6 is displaced in the focus direction, the central position of the reflected luminous flux 12 is kept unchanged, and its diameter is only changed. Hence, if automatic gain control is in execution, the R-tilt signal remains unchanged.

As described above, for the tilt sensor 38 according to the first embodiment, even if the optical disk 6 is displaced in the focus direction, or even if a relative tilt is given between the optical head 45 and the optical disk 6 in the T-directions (i.e., around the axis in the R-directions), that will not affect the detection of the relative tilt between the optical head 45 and the optical disk 6 in the R-directions (i.e., around the axis in the T-directions).

In addition, the tilt sensor 38 according to the first embodiment and the optical head 45 which includes the tilt sensor 38 also have the following advantages. First, the tilt sensor 38 is small, and thus, the shape of the optical head 45 is not affected. Besides, the light source which detects the relative tilt is the LED chip 35, thereby narrowing its dispersion. Moreover, the LED chip 35 and the light-receiving chips 31a, 31b are united with the semiconductor substrate 30. Thus, there is no need to precisely adjust the position of the tilt sensor 38 on the optical head 45. Furthermore, the tilt sensor 38 can be put in a position apart from the semiconductor laser 41 which is the part where the temperature goes up to the highest level in the optical head 45. Therefore, the influence which the heat of the semiconductor laser 41 has on the tilt sensor 38 can be reduced. As a result, the possibility becomes slim that the position or direction of the luminous flux 11 which is emitted from the LED chip 35 may be changed by a change in temperature. Besides, there is little possibility of making an error in detecting a relative tilt.

Furthermore, simply by dividing, in two, the light-receiving region of the reflected luminous flux 12, it functions as the tilt sensor 38. This prevents its configuration from becoming complicated, and at the same time, makes the tilt sensor 38 smaller.

In the optical head 45 according to the first embodiment, there is provided a tilt correcting mechanism (not shown). This tilt correcting mechanism is configured so as to execute drive control of the actuator 43, based on the result which is outputted by the tilt sensor 38. This drive control of the actuator 43 corrects the position of an objective lens in the focus direction and tracking direction. Herein, the tilt correcting mechanism is not limited to such a configuration for controlling the drive of the actuator 43. For example, it may also be configured so as to control the position or posture of the optical head 45 itself.

Second Embodiment

Figure 4:
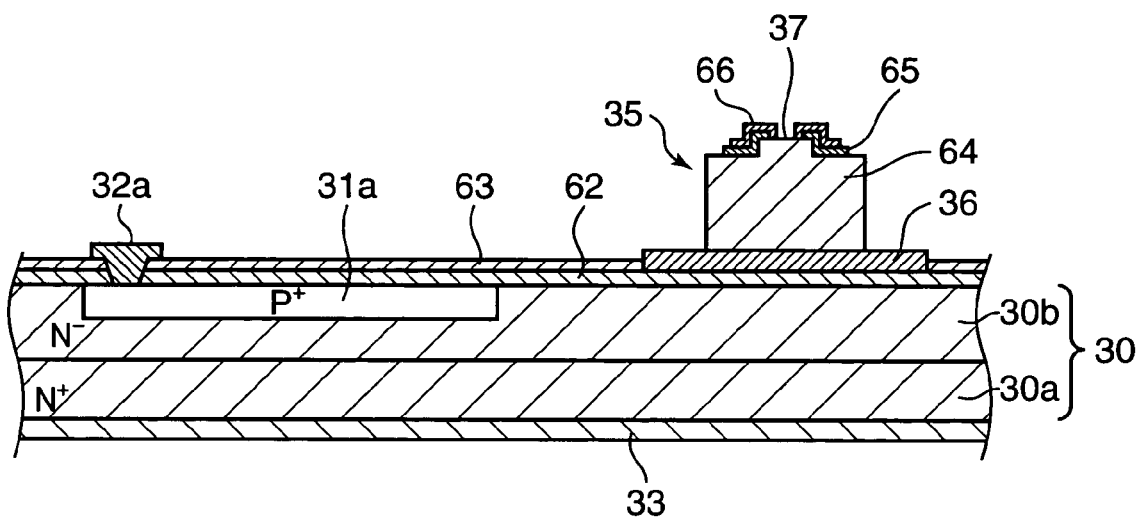
FIG. 4 is a sectional view of the tilt sensor according to the second embodiment of the present invention, showing its configuration.

According to the first embodiment, after the semiconductor substrate 30 is formed, the LED chip 35 is placed over the semiconductor substrate 30. However, according to the second embodiment, as shown in FIG. 4, the LED chip 35 is united with the semiconductor substrate 30 in processing steps. Herein, FIG. 4 is a sectional view of the sensor 38 according to the second embodiment, seen along a IV-IV line in FIG. 1A.

The semiconductor substrate 30 includes an $N^+$ semiconductor layer 30a which contains an N-type impurity at a relatively high concentration, and an $N^-$ semiconductor layer 30b which contains an N-type impurity at a relatively low concentration. The concentration of the impurity in the $N^-$ semiconductor layer 30b is set to an adequately low level. Practically, it functions as an intrinsic semiconductor which has a high resistance.

In the upper part of the $N^-$ semiconductor layer 30b, an impurity diffusive region is provided which contains a P-type impurity at a relatively high concentration. This impurity diffusive region forms the light-receiving chips 31a, 31b. Each of the first light-receiving chip 31a and the second light-receiving chip 31b has the same impurity-concentration profile, and consequently, has substantially the same property, optically and electrically. The fact that both light-receiving chips 31a, 31b have the same impurity-concentration profile means that the light-receiving chips 31a, 31b are formed at the same time.

On the bottom surface (or lower surface) of the semiconductor substrate 30, the third electrode 33 is evaporated as a cathode electrode. This third electrode 33 is connected to a cathode terminal (not shown). On the other hand, the upper surface of the semiconductor substrate 30 is covered with an insulating film 62 and a protective film 63. The first electrode 32a as an anode electrode is connected to the light-receiving chip 31a, through a contact hole which is formed in the insulating film 62 and the protective film 63. This first electrode 32a is connected to an anode terminal (not shown). The second electrode 32b also has the same configuration as that of the first electrode 32a, and thus, it is connected to the second light-receiving chip 31b.

Between the first electrode 32a and the second electrode 32b, and the third electrode 33, there is formed a vertical PIN diode. This vertical PIN diode generates a photoelectric current according to the received-light quantity. Then, this photoelectric current which passes through the vertical PIN diode is detected directly or indirectly. Thereby, the quantity of light which has irradiated each light-receiving chip 31a, 31b can be obtained.

On the insulating film 62, there is formed the fourth electrode 36 which is made of a metal film. A semiconductor layer 64 which has a PN junction is formed on this fourth electrode 36. On the upper surface of the semiconductor layer 64, except for its central part, there are formed an insulating film 65 and a fifth electrode 66. The upper-surface central part of the semiconductor layer 64 is the light-emitting point 37. According to this configuration, the LED chip 35 is united with the semiconductor substrate 30.

According to the second embodiment, when a separate LED chip is placed on the semiconductor substrate 30, an error can be prevented from being made in its position and angle on the surface of the semiconductor substrate 30. This keeps under control the inclination of the optical axis of the emitted luminous flux 11, or the dispersion of the position where it emits light. Therefore, the optical head 45 can be realized which is capable of detecting the tilt of the optical disk 6 more precisely.

Herein, the other configurations, operation and advantages are the same as those according to the first embodiment.

Third Embodiment

The configuration and operation according to the third embodiment of the present invention will be described with reference to FIG. 5A, FIG. 5B and FIG. 5C.

Figure 5B:
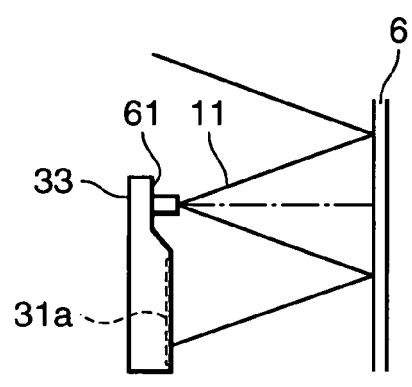
FIG. 5B is a side view of the tilt sensor in the optical head according to the third embodiment of the present invention.
Figure 5A:
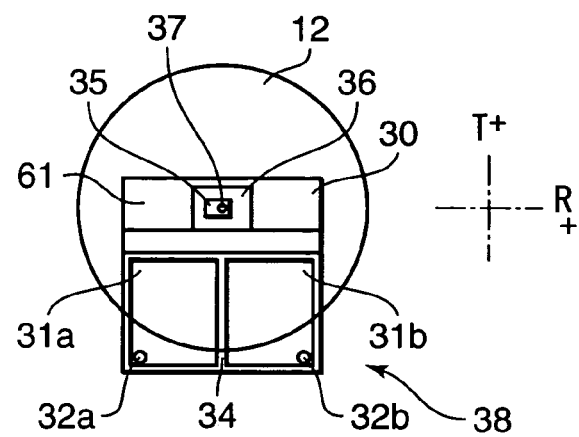
FIG. 5A is a plan view of a tilt sensor in an optical head according to the third embodiment of the present invention.
Figure 5C:
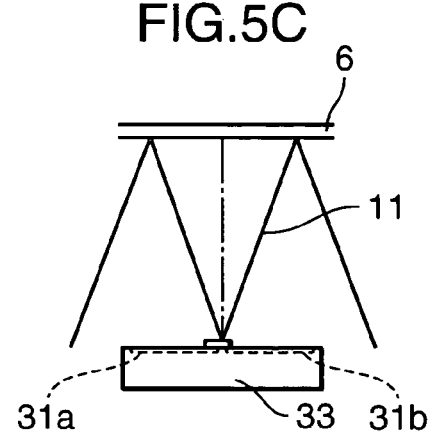
FIG. 5C is a front view of the tilt sensor in the optical head according to the third embodiment of the present invention.

FIG. 5A, FIG. 5B and FIG. 5C are a plan view, a side view and a front view of the tilt sensor 38 in the optical head 45 according to the third embodiment. These figures show the tilt sensor 38 schematically. Its configuration and function are described below. Herein, in FIG. 5A, FIG. 5B and FIG. 5C, the components have the same reference numerals and characters as those in FIG. 1A, FIG. 1B and FIG. 1C, as long as the former corresponds to the latter. Herein, a description is given only of the configuration and function which are different from those according to the first embodiment.

In the end part of the semiconductor substrate 30, there is formed a concave portion 61. The end part where this concave portion 61 is formed is thinner than the remaining parts of the semiconductor substrate 30. The concave portion 61 is formed by cutting off a part of the surface on the side (i.e., the right side in FIG. 5B) where the light-receiving chips 31a, 31b are formed in the semiconductor substrate 30.

The semiconductor substrate 30 is 0.5 mm thick as a whole, but the end part where the concave portion 61 is formed has a thickness of 0.2 mm. The LED chip 35 is placed in the concave portion 61. Therefore, the height at which the LED chip 35 protrudes from the semiconductor substrate 30 can be kept down, comparing with that according to the first embodiment. This makes it easier to handle the tilt sensor 38.

The side surface of the concave portion 61 is shaped so that it is tapered in the semiconductor substrate 30. Thus, the distance between the LED chip 35 and the light-receiving chips 31a, 31b needs to be widened by the length that corresponds to the taper. Thereby, the tilt sensor 38 becomes 2.7 mm×2.65 mm, and 0.55 mm high.

The schematic configuration of the optical head 45 which includes the tilt sensor 38 is the same as that in FIG. 2A, FIG. 2B and FIG. 2C according to the first embodiment. Therefore, the tilt sensor 38 according to the second embodiment has the same function as that in FIG. 3A, FIG. 3B and FIG. 3C. It can detect, as an R-tilt signal, a relative tilt between the optical head 45 and the optical disk 6 in the R-directions (i.e., around the axis in the T-directions).

According to the third embodiment, the LED chip 35 is placed in the concave portion 61. Therefore, in addition to the features according to the first embodiment, the following features can be obtained. The LED chip 35 protrudes by a shorter length from the semiconductor substrate 30, and the tilt sensor 38 becomes easier to handle as a single component. Besides, the side surface of the concave portion 61 has a taper shape. Thereby, the unnecessary light of the LED chip 35 is reflected by the taper part of the concave portion 61, thus preventing it from reaching the optical disk 6.

Herein, according to the third embodiment, the LED chip 35 may also be united with the semiconductor substrate 30 in processing steps, in the same way as according to the second embodiment. The other configurations, operation and advantages are the same as those according to the first embodiment.

Fourth Embodiment

The configuration and operation according to the fourth embodiment of the present invention will be described with reference to FIG. 6A, FIG. 6B and FIG. 6C.

Figure 6B:
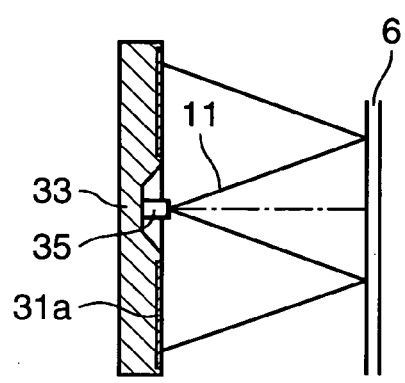
FIG. 6B is a side sectional view of the tilt sensor in the optical head according to the fourth embodiment of the present invention.
Figure 6A:
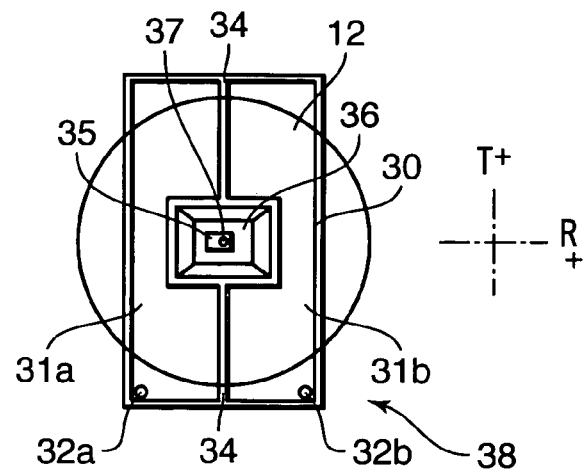
FIG. 6A is a plan view of a tilt sensor in an optical head according to the fourth embodiment of the present invention.
Figure 6C:
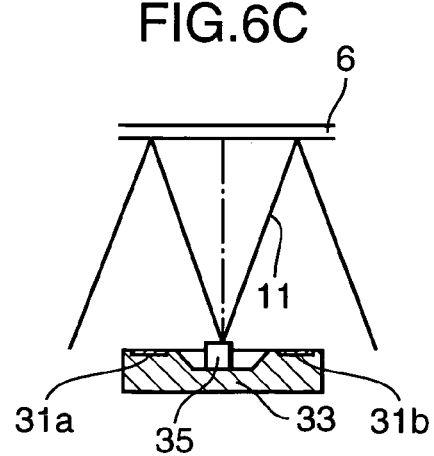
FIG. 6C is a front sectional view of the tilt sensor in the optical head according to the fourth embodiment of the present invention.

FIG. 6A, FIG. 6B and FIG. 6C are a plan view, a side sectional view and a front sectional view of the tilt sensor 38 in the optical head 45 according to the fourth embodiment. These figures show the tilt sensor 38 schematically. According to the fourth embodiment, the features according to the third embodiment become more conspicuous. Thus, in FIG. 6A, FIG. 6B and FIG. 6C, the components have the same reference numerals and characters as those in FIG. 5A, FIG. 5B and FIG. 5C, as long as the former corresponds to the latter. Herein, a description is given only of the configuration and function which are different from those according to the third embodiment.

The semiconductor substrate 30 is 0.5 mm thick as a whole. The concave portion 61 is formed in the central part of the surface on one side (i.e., the right side in FIG. 6B) in the semiconductor substrate 30. In the surface where this concave portion 61 is formed, almost over its whole part, the light-receiving chips 31a, 31b are formed so as to surround the concave portion 61. The concave portion 61 is formed in the central part of the semiconductor substrate 30, and the LED chip 35 is placed in the concave portion 61. This allows the semiconductor substrate 30 to have a flat-plate shape as a whole.

The central part where the concave portion 61 is formed is 0.2 mm thick. In the concave portion 61, the LED chip 35 is placed so that the light-emitting point 37 is located at its central part. The side surface of the concave portion 61 is shaped like a taper, and thus, the distance between the LED chip 35 and the light-receiving chips 31a, 31b needs to be widened by the length that corresponds to the taper. Thereby, the tilt sensor 38 has a size of 2.7 mm×4.5 mm, and 0.55 mm in height.

The schematic configuration of the optical head 45 which includes the tilt sensor 38 is the same as that in FIG. 2A, FIG. 2B and FIG. 2C according to the first embodiment. Therefore, the tilt sensor 38 according to the fourth embodiment has the same function as that in FIG. 3A, FIG. 3B and FIG. 3C. Hence, it can detect, as an R-tilt signal, a relative tilt between the optical head 45 and the optical disk 6 in the R-directions (i.e., around the axis in the T-directions).

The configuration according to the fourth embodiment has the features according to the first embodiment as well as the features according to the third embodiment, but the latter features are more conspicuous than the former. Specifically, the LED chip 35 is placed in the concave portion 61 at the center of the semiconductor substrate 30. Therefore, in addition to the features according to the first embodiment, the following features can be obtained. The LED chip 35 protrudes by a shorter length from the semiconductor substrate 30, and the tilt sensor 38 becomes easier to handle as a single component. Besides, the side surface of the concave portion 61 has a taper shape. Thereby, the unnecessary light of the LED chip 35 is prevented from reaching the optical disk 6.

Herein, according to the fourth embodiment, the LED chip 35 may also be united with the semiconductor substrate 30 in processing steps, in the same way as according to the second embodiment. The other configurations, operation and advantages are the same as those according to the third embodiment.

Fifth Embodiment

The configuration and operation according to the fifth embodiment of the present invention will be described with reference to FIG. 7A, FIG. 7B and FIG. 7C.

FIG. 7A, FIG. 7B and FIG. 7C are a plan view, a side sectional view and a front sectional view of the tilt sensor 38 in the optical head 45 according to the fifth embodiment. These figures show a schematic configuration of the tilt sensor 38. In FIG. 7A, FIG. 7B and FIG. 7C, the components have the same reference numerals and characters as those in FIG. 6A, FIG. 6B and FIG. 6C, as long as the former corresponds to the latter. Herein, a description is given only of the configuration and function which are different from those according to the fourth embodiment. Herein, the schematic configuration of the optical head 45 which includes the tilt sensor 38 is the same as that in FIG. 2A, FIG. 2B and FIG. 2C according to the first embodiment.

Between the tilt sensor 38 and the optical disk 6, a cylindrical element 46 is disposed which is made of a cylindrical lens. This cylindrical element 46 has a substantially square shape in plan view. It is placed so that its bus line meets the division line 34 of the light-receiving chips 31a, 31b at an angle of 45 degrees. In the central part of the cylindrical element 46, there is formed a through hole 46a. The luminous flux 11 which has been emitted from the LED chip 35 passes through this through hole 46a. In other words, the emitted luminous flux 11 which goes to the optical disk 6 from the LED chip 35 does not pass through the cylindrical element 46. On the other hand, the luminous flux 12 which has been reflected from the optical disk 6 passes through the cylindrical element 46. The cylindrical element 46 works on the whole reflected luminous flux 12 which is incident upon the first light-receiving chip 31a and the second light-receiving chip 31b. It is most desirable that the cylindrical element 46 be placed so that its generating line crosses the division line 34 of the light-receiving chips 31a, 31b at an angle of 45 degrees. However, even if it lies at an angle of 40 degrees or wider and 50 degrees or narrower, the advantage within the permissible range can be obtained.

Figure 8:
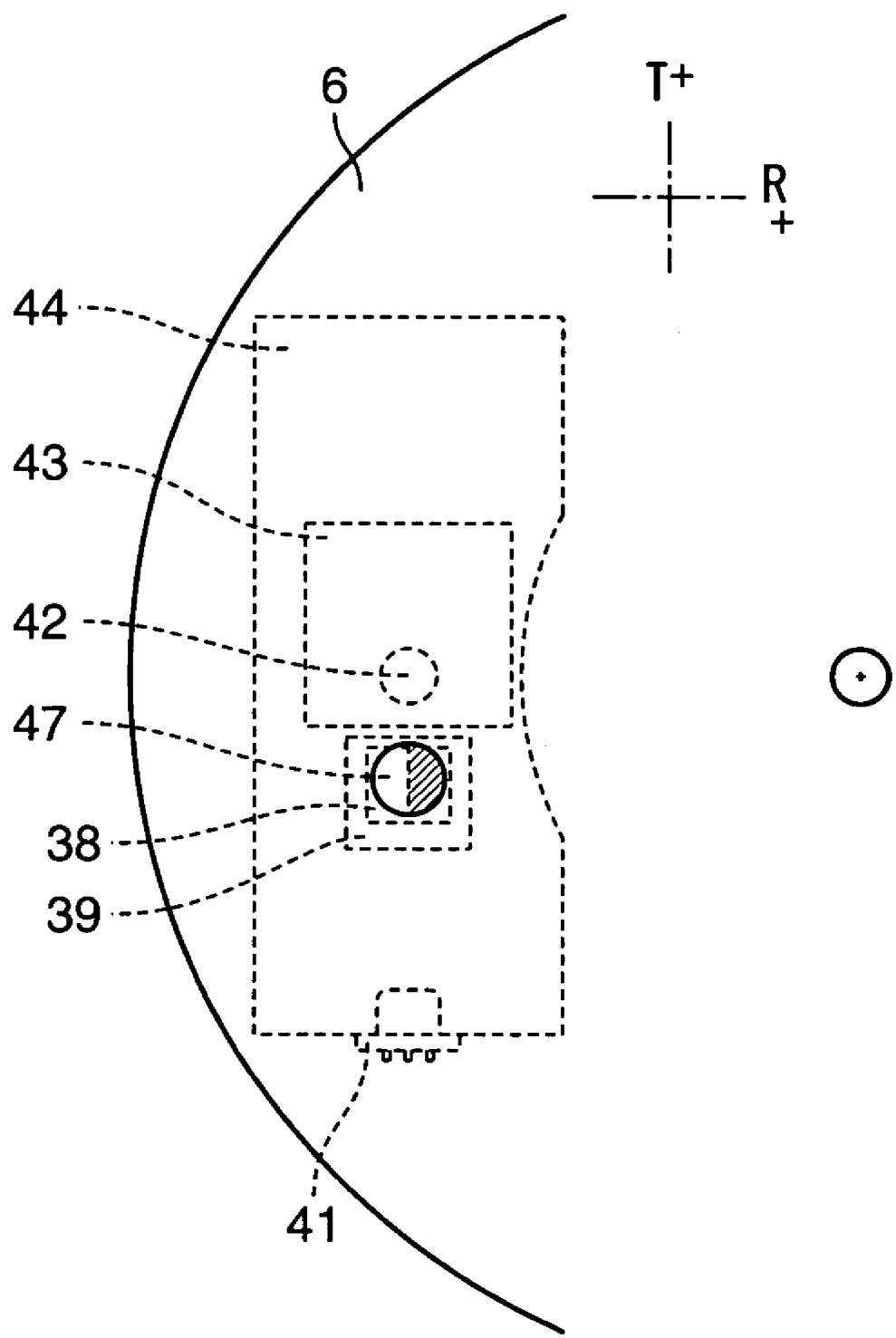
FIG. 8 is a plan view of an optical head according to the fifth embodiment of the present invention, showing an irradiation luminous flux which is formed on an optical disk.

Herein, a description is given of the case where the reflectance ratio of the optical disk 6's recorded part is different from that of its not-yet recorded part. The recorded part and not-yet recorded part are adjacent to each other in the R-directions of the optical disk 6, and they each have a different reflectance ratio. Thus, if the luminous flux 11 which has been emitted from the LED chip 35 irradiates the optical disk 6, as shown in FIG. 8, a half in the R-directions of an irradiation luminous flux 47 which is formed on the optical disk 6 becomes dark. In other words, it has a bright half and a dark half in the R-directions. Then, in this state, the luminous flux 11 is reflected to the tilt sensor 38.

According to the above described fourth embodiment (see FIG. 6A), no cylindrical element is provided. In such a case, if the tilt sensor 38 is used, the reflected luminous flux 12 is supposed to have a bright half and a dark half in the R-directions. Thereby, the receiving-light quantity of the second light-receiving chip 31b becomes smaller than that of the first light-receiving chip 31a. In other words, even if no relative tilt is given between the optical head 45 and the optical disk 6, it outputs an R-tilt signal. As a result, it cannot steadily detect a relative tilt between the optical head 45 and the optical disk 6 in the R-directions (i.e., around the axis in the T-directions).

In contrast, in the tilt sensor 38 according to the fifth embodiment, the reflected luminous flux 12 reflected from the optical disk 6 which has a bright half and a dark half in the R-directions passes through the cylindrical element 46. At this time, with respect to this luminous flux 12 which has passed, its luminous-flux section in the face which includes the generating line is transmitted without undergoing any change. On the other hand, its luminous-flux section in the face which crosses at a right angle with the generating line converges by the lens effect. Then, this luminous flux 12 becomes divergent again after passing through the focal point of the cylindrical element 46. At this time, the directions in which the luminous flux converges and diverges also inclines at an angle of 45 degrees to the R-directions, because the cylindrical element 46 is a cylindrical lens which is placed so that its generating line is kept turned at an angle of 45 degrees with respect to the R-directions. As a result, the boundary between the bright and dark parts in the divergent luminous flux turns at an angle of 90 degrees with respect to the luminous flux before it is transmitted. This tilt sensor 38 is put in a position in the optical-axis directions, so that this divergent luminous flux becomes almost as large as the luminous-flux section in the face which includes the generating line which has undergone no change. Therefore, the image of the luminous flux which is incident on the cylindrical element 46 is turned at an angle of 90 degrees in the position of the tilt sensor 38 and has a substantially circular shape.

Figure 9B:
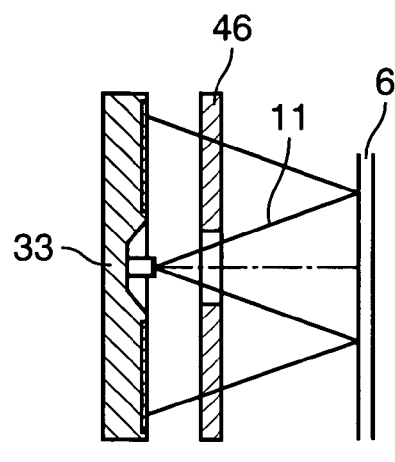
FIG. 9B is a side sectional view of the tilt sensor in the optical head according to the fifth embodiment of the present invention.
Figure 9A:
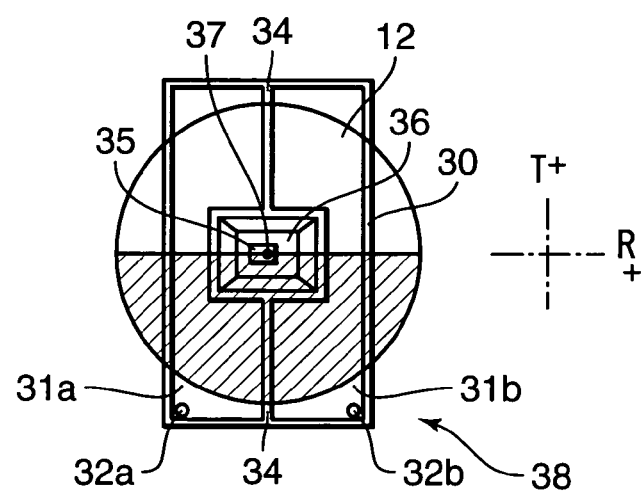
FIG. 9A is a plan view of a tilt sensor in the optical head according to the fifth embodiment of the present invention, showing a reflected luminous flux which irradiates it.
Figure 9C:
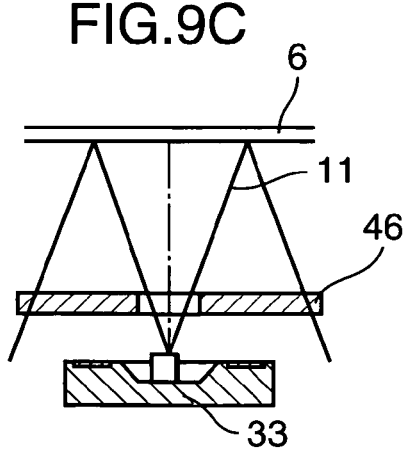
FIG. 9C is a front sectional view of the tilt sensor in the optical head according to the fifth embodiment of the present invention.

Therefore, according to the fifth embodiment, the luminous flux 12 reflected from the optical disk 6 which has a bright half and a dark half in the R-directions, as shown in FIG. 9A, becomes a luminous flux whose image turns at an angle of 90 degrees in the position of the tilt sensor 38 and which has a bright half and a dark half in the directions perpendicular to the R-directions. Thereby, in the first light-receiving chip 31a and the second light-receiving chip 31b whose boundary is the division line 34 which extends in the T-directions, their receiving-light quantity is equal to each other. Even in the case where the case where the reflectance ratio of the optical disk 6's recorded part is different from that of its not-yet recorded part, the R-tilt signal of the differential circuit 13 cannot be affected. In other words, according to the fifth embodiment, if no relative tilt is given between the optical head 45 and the optical disk 6, an R-tilt signal is prevented from being outputted based upon the brightness and darkness of the irradiation luminous flux 47. Therefore, the situation is avoided in which the relative tilt in the R-directions between the optical head 45 and the optical disk 6 cannot steadily detected.

Figure 10:
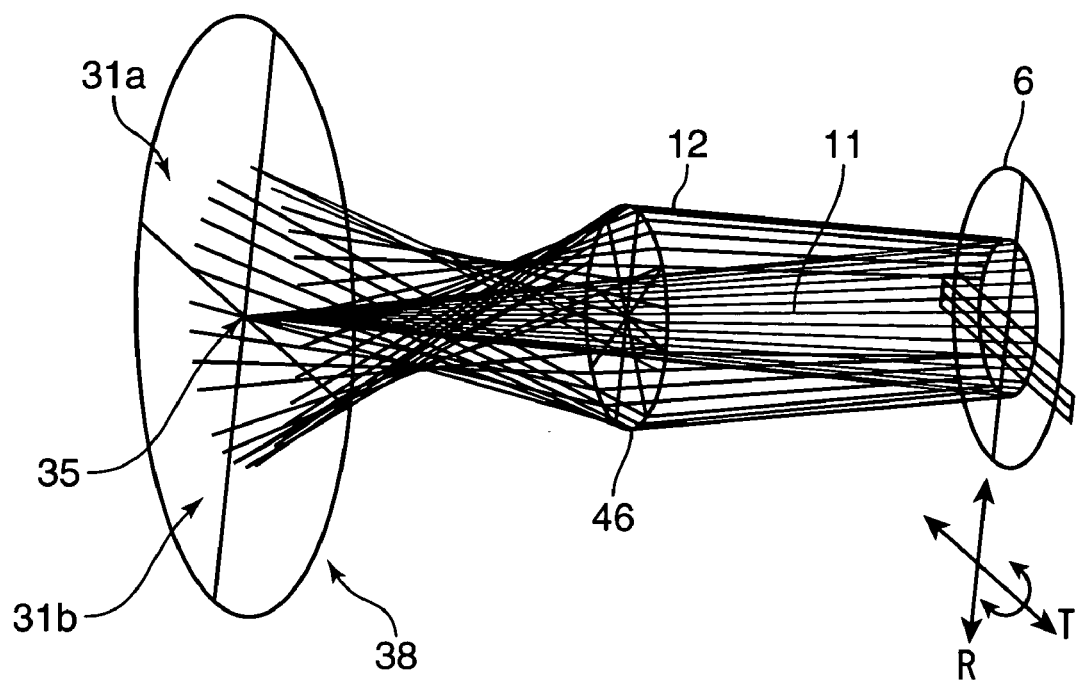
FIG. 10 is a representation, showing the loci of rays of luminous flux which is emitted from an LED chip and rays of luminous flux which is reflected from an optical disk.

This operation will be described, using FIG. 10 to FIG. 12C which show it as a typical example. FIG. 10 shows the configuration of FIGS. 7A-7C typically, and also shows traced rays of the luminous flux 11 which has been emitted from the LED chip 35 and traced rays of the luminous flux 12 which has been reflected from the optical disk 6. FIG. 11 shows conceptually the distribution of the irradiation luminous flux 47 on the optical disk 6. As shown in FIG. 11, the irradiation luminous flux 47 includes a low reflectance-ratio part 47a. This low reflectance-ratio part 47a shows, for example, a distribution which extends in the T-directions.

FIGS. 12A to 12C show the first light-receiving chip 31a and the second light-receiving chip 31b of the tilt sensor 38, and the distribution of the reflected luminous flux 12 from the optical disk 6 which is incident upon them. FIG. 12A shows the case where there is no tilt around the T-axis. FIG. 12B and FIG. 12C show the cases where the tilt around the T-axis becomes gradually large. In the same way as the irradiation luminous flux 47, this reflected luminous flux 12 also includes a low reflectance-ratio part 12a. However, the distribution of the low reflectance-ratio part 12a in this tilt sensor 38, as described above, turns at an angle of 90 degrees from the bright and dark images of the irradiation luminous flux 47. Hence, it shows a distribution which extends in the R-directions. If the optical disk 6 has a tilt around the T-axis, this tilt changes the position of the reflected luminous flux 12. This change is a positional shift in the R-directions, in the same way as in FIGS. 3A-3C. However, the low reflectance-ratio part 12a is distributed in the R-directions. Thereby, even if the optical disk 6 has a tilt around the T-axis and the position of the reflected luminous flux 12 is shifted, the quantity of light which is received by each of the first light-receiving chip 31a and the second light-receiving chip 31b is not easily affected by the low reflectance-ratio part 12a. Thus, the differential between both light-receiving chips 31a, 31b is detected, and thereby, an R-tilt signal is outputted.

In this way, the configuration according to the fifth embodiment has not only the features according to the first, second, third and forth embodiments, but also the following features. Even if the reflectance ratio of the optical disk 6's recorded part is different from that of its not-yet recorded part, and the irradiation luminous flux 47 has the low reflectance-ratio part 47a at a part thereof in the R-directions, the relative tilt in the R-directions (i.e., around the axis in the T-directions) between the optical head 45 and the optical disk 6 can steadily detected as an R-tilt signal.

Herein, according to the fifth embodiment, the LED chip 35 may also be united with the semiconductor substrate 30 in processing steps, in the same way as according to the second embodiment. The other configurations, operation and advantages are the same as those according to the fourth embodiment.

Sixth Embodiment

According to the above described first to fifth embodiments, the description has been given of the tilt sensor 38 which is disposed on the optical head 45 in the case where a reflecting body is the optical disk 6. Such a tilt sensor 38 is configured so that the relative tilt between the optical head 45 and the optical disk 6 in the R-directions (i.e., around the axis in the T-directions) is detected as an R-tilt signal. However, the purport of the present invention is not limited to the above described configurations. It also includes detecting a positional shift of the optical disk 6. In other words, in variation of the tilt sensor 38, in the optical head 45, the displacement (i.e., the positional shift) of the optical disk 6 in the focus direction from a predetermined reference can be detected.

In the tilt sensor 38 according to the first embodiment, the division line 34 of the light-receiving chips 31a, 31b is disposed in parallel with the T-directions (see FIG. 1A) As shown in FIG. 13, however, the division line 34 may also be disposed, for example, in parallel with the R-directions. According to this configuration, it becomes a sensor which can detect the positions of the optical head 45 and the optical disk 6.

Specifically, if the optical disk 6 is displaced in the focus direction, the central position of the luminous flux 12 remains unchanged, and its diameter is changed. Then, in response to the diameter of the luminous flux 12, the quantity of light which is received by the first light-receiving chip 31a and the second light-receiving chip 31b is changed. Therefore, based on the receiving-light quantity of each light-receiving chip 31a, 31b, the displacement (i.e., the positional shift) of the optical disk 6 in the focus direction with respect to the optical head 45 can be obtained.

Herein, according to the sixth embodiment, the LED chip 35 may also be united with the semiconductor substrate 30 in processing steps, in the same way as according to the second embodiment. The other configurations, operation and advantages are the same as those according to the first embodiment.

Seventh Embodiment

Figure 14:
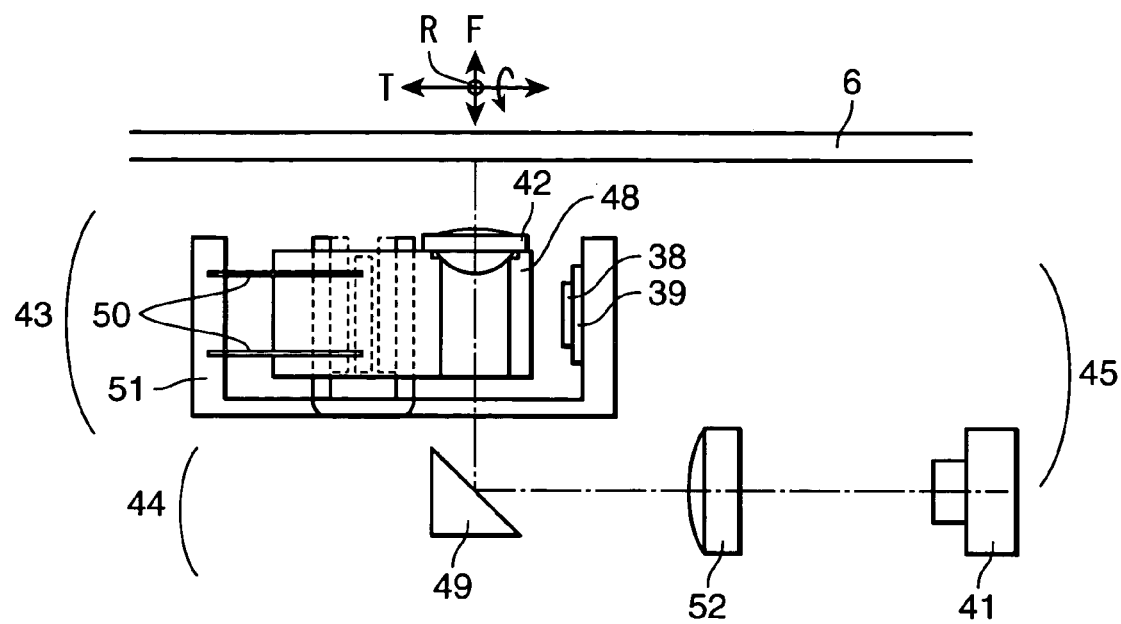
FIG. 14 is a side view of an optical head according to the seventh embodiment of the present invention, showing its configuration.

As shown in FIG. 14, the sensor 38 according to the seventh embodiment of the present invention is different from the sensors according to the above described first to sixth embodiments. It is configured as a sensor which detects a positional shift or a tilt of an optical component or the like.

For example, in the case where an objective lens which is an optical component is displaced together with its holding member (described later), for example, if the light which is emitted from the LED chip 35 of the position sensor 38 irradiates the holding member, and the position sensor 38 is put in a position (e.g., near the holding member) where its reflected light can be received by the position sensor 38's light-receiving region, then the tilt or positional shift of the holding member can be detected. Thereby, the tilt or positional shift of the objective lens which is held by the holding member can be detected.

Specifically, as shown in FIG. 14, the optical head 45 includes the optical block 44, and the actuator 43 which is the light-converging element driving means. The actuator 43 includes a fixing portion 51, a holding member 48 and the objective lens 42. The holding member 48 is held to the fixing portion 51, by means of four pieces of wires 50 which are disposed in the fixing portion 51. The objective lens 42 is held by the holding member 48.

The optical block 44 includes, as its main components, the semiconductor laser 41, a collimating lens 52, a mirror 49 and the like. The light which is emitted from the semiconductor laser 41 passes through the collimating lens 52 to turn into a substantially parallel beam of light. Then, it is reflected by the mirror 49, and then, it is incident upon the objective lens 42 on the holding member 48, so that an information signal is recorded in the optical disk 6 and its recorded information signal is regenerated.

The tilt sensor 38 according to this embodiment is disposed, via the distribution board 39, in the fixing portion 51 of the actuator 43. This tilt sensor 38 emits light to the holding member 48, and receives its reflected light at the light-receiving chip. Herein, if the light-receiving chip is divided in two in the same way as that according to the first embodiment, the tilt of the holding member 48 can be detected in the same principle as the tilt of the optical disk 6 can be. Therefore, for example, if the posture of an optical-disk driving device is changed, or if such a case takes place, the distance by which the objective lens 42 has been displaced by its own weight can be detected, using a position-detection signal of the objective lens 42. Hence, the position of the objective lens 42 can be corrected inside of the optical head 45, thereby controlling the optical disk 6 steadily.

Figure 15:
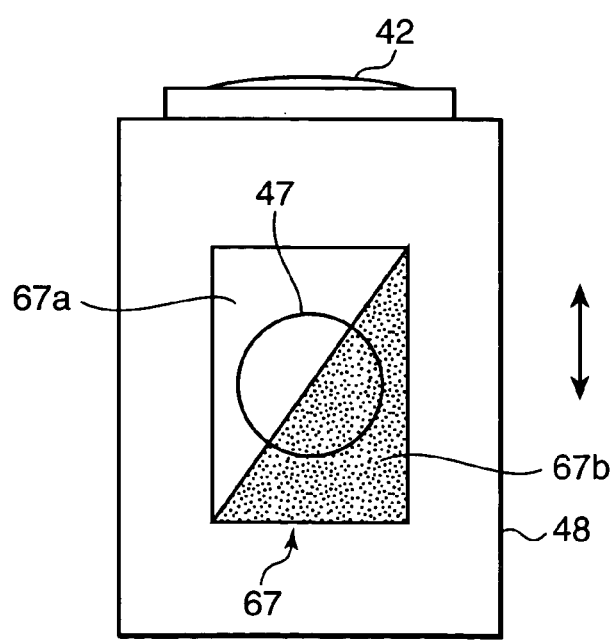
FIG. 15 is a representation, showing an irradiation luminous flux which is formed in a holding member according to the seventh embodiment of the present invention.

Herein, instead of the configuration where the light-receiving chip of the tilt sensor 38 is divided in two, a configuration may also be used in which the tilt sensor 38 is not divided. In that case, the region which reflects the emitted luminous flux in the holding member 48 is divided into a plurality of areas which each have a different reflectance ratio. For example, as shown in FIG. 15, a reflection region 67 includes a first reflection part 67a which has a relatively high reflectance ratio, and a second reflection part 67b which has a lower reflectance ratio than that of this first reflection part 67a. The tilt sensor 38 is set in a position so that the irradiation luminous flux 47 which is formed on the reflection region 67 spreads over the first reflection part 67a and the second reflection part 67b. If the position of the holding member 48 shifts, for example, in the up-and-down directions in FIG. 15, this positional shift changes the reflectance ratio of the irradiation luminous flux 47 in the reflection region 67. Thereby, the positional shift of the holding member 48 can be detected. In other words, a shift in the position of the holding member 48 in directions substantially perpendicular to the direction which a luminous flux is emitted from the LED chip 35 can be detected. Even in this case, a tilt in the right-and-left directions can be detected of the holding member 48.

Herein, according to the seventh embodiment, the LED chip 35 may also be united with the semiconductor substrate 30 in processing steps, in the same way as according to the second embodiment. The other configurations, operation and advantages are the same as those according to the first embodiment.

Eighth Embodiment

Figure 16:
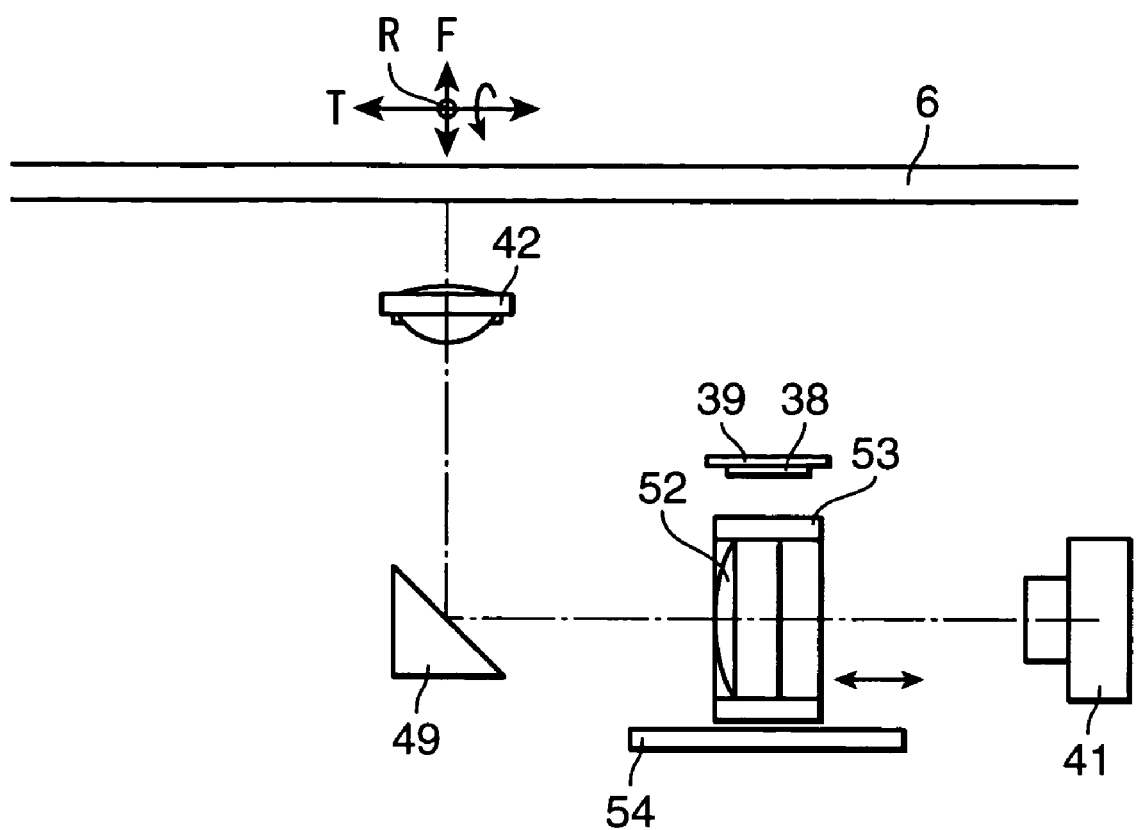
FIG. 16 is a side view of an optical head according to the eighth embodiment of the present invention, showing its configuration.

As shown in FIG. 16, the sensor 38 according to the eighth embodiment of the present invention is configured as a sensor which detects a tilt or a positional shift of the collimating lens 52 which is an optical component that is disposed between the semiconductor laser 41 and the objective lens 42.

The collimating lens 52 is used to transform the light which is emitted from the semiconductor laser 41 into a parallel beam of light. It is configured so that it is moved, together with its holding member 53, in the optical-axis directions by a driving mechanism 54. In this case, if the light which is emitted from the LED chip 35 of the sensor 38 according to the eighth embodiment irradiates the holding member 53, and the sensor 38 is put in a position (e.g., near the holding member 53) where its reflected light can be received by the sensor 38's light-receiving region, then the position of the holding member 53 can be detected. Thereby, the position of the collimating lens 52 which is held by the holding member 53 can be detected.

Specifically, as shown in FIG. 16, the optical head 45 includes, as its main components: the semiconductor laser 41; the collimating lens 52; the holding member 53; the driving mechanism 54; the mirror 49; the objective lens 42; and the like. The collimating lens 52 is held by the holding member 53 and is disposed between the semiconductor laser 41 and the mirror 49. The driving mechanism 54 drives the holding member 53 in the optical-axis directions.

The tilt sensor 38 is attached, via the distribution board 39, to the optical block 44. The tilt sensor 38 emits light to the holding member 53, and receives its reflected light at the light-receiving chip. Thereby, the tilt or positional shift of the holding member 53 can be detected. Hence, using the detected position-detection signal of the collimating lens 52, for example, a spherical aberration which is caused by the thickness of the optical disk 6 can be corrected by controlling the position of the collimating lens 52 in the optical head 45.

In addition, between the collimating lens 52 and the objective lens 42, there may be further provided: at least two lenses (not shown) which receive a parallel beam of light from the collimating lens 52; a holding member (not shown) which holds one of these two lenses; and a moving mechanism (not shown) which moves the one lens and the holding member together in the optical-axis directions. In the case of this configuration, if the light which is emitted from the LED chip 35 of the sensor 38 described according to this embodiment irradiates the holding member, and the sensor 38 is put in a position (e.g., near the holding member) where its reflected light can be received by the sensor 38's light-receiving region, then the position of the one lens which is an optical component held by the holding member can be detected. Thereby, the position of the collimating lens 52 which is held by the holding member can be detected. According to such a configuration, using a position-detection signal of the one lens, for example, a spherical aberration which is caused by the thickness of the optical disk can be corrected by controlling the position of the one lens in the optical head.

Herein, according to the first to eighth embodiments which have been described hereinbefore, the tilt sensor 38 is placed in the optical head 45, and it detects a tilt or a positional shift of the optical disk 6 as a reflecting body, or an component of the optical head 45. However, the tilt sensor 38 is not limited to the one that is placed in the optical head 45. In addition, the reflecting body is not limited to the optical disk 6, or an component of the optical head 45. Herein, according to the above described configurations, the sensors themselves which detect a tilt or a positional shift of a reflecting body are based upon the purport of the present invention.

Furthermore, according to the first to eighth embodiments which have been described hereinbefore, in the tilt sensor 38, the light-receiving chips 31a, 31b are provided on the semiconductor substrate 30, so that it function as what is called a photodiode which is divided in two. However, even if the tilt sensor 38 is a sensor which is provided, on the semiconductor substrate 30, with a circuit portion which amplifies a photo-electric current from the light-receiving chips 31a, 31b and makes a calculation, such a sensor is based upon the purport of the present invention.

Ninth Embodiment

Figure 17:
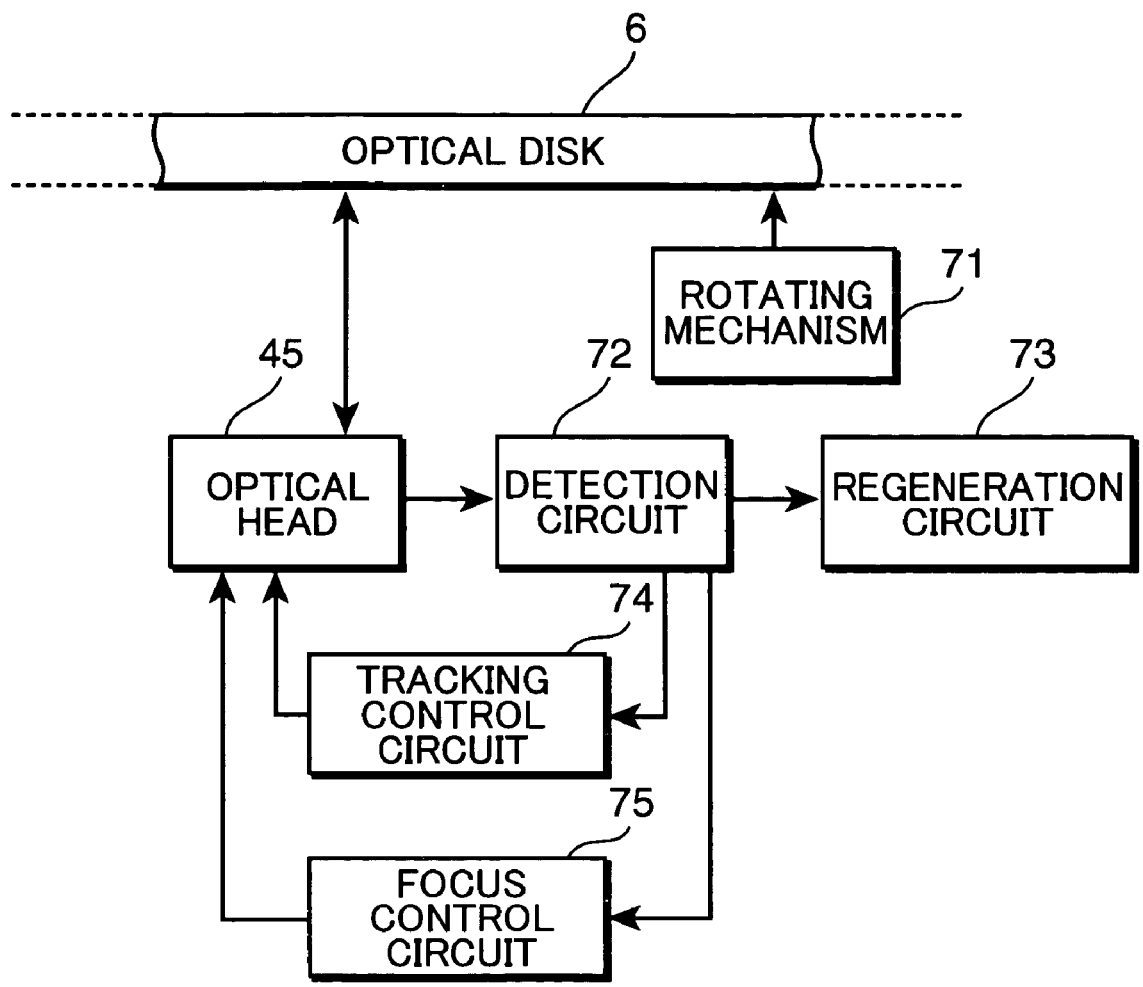
FIG. 17 is a schematic diagram, showing the configuration of an optical-information medium driving device according to the ninth embodiment of the present invention.
Figure 18:
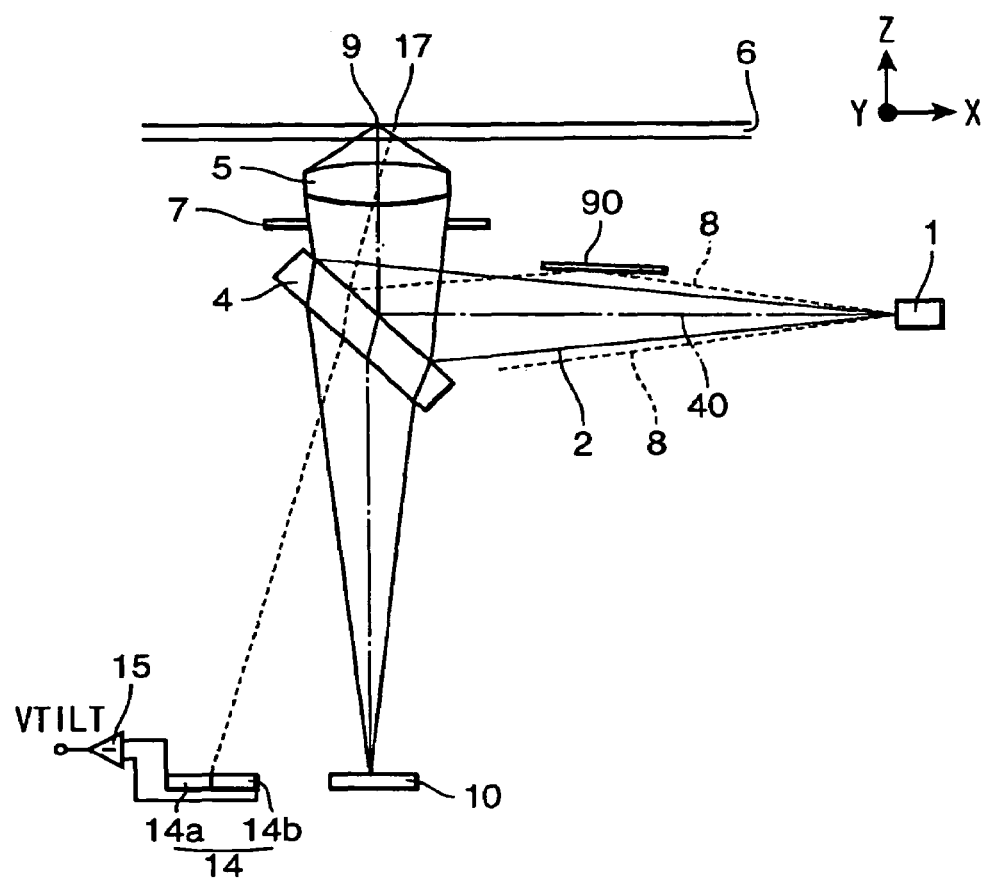
FIG. 18 is a side view of a conventional optical head which detects the tilt of an optical disk, showing its configuration.

The configuration of an optical-information medium driving device will be described which the optical head 45 according to the first embodiment is applied to. As shown in FIG. 17, this optical-information medium driving device includes, as its main components: the optical head 45; a rotating mechanism 71; a detection circuit 72; a regeneration circuit 73; a tracking control circuit 74; a focus control circuit 75; and the like.

The rotating mechanism 71 rotates the optical disk 6 using a motor (not shown). The detection circuit 72 generates a regeneration signal, a tracking-error signal and a focus-error signal, based on the reflected light which has been allowed to branch off by the optical head 45. Based on the regeneration signal, the regeneration circuit 73 regenerates information which is recorded in the optical disk 6. Based on the tracking-error signal, the tracking control circuit 74 controls the optical head 45 so that a tracking error can be compensated. Based on the focus-error signal, the focus control circuit 75 controls the optical head 45 so that a focus error can be compensated.

Herein, according to this embodiment, the optical head 45 according to the first embodiment is applied, but instead, the optical head 45 according to any one of the second to seventh embodiments may also be applied.

This application is based on Japanese patent application serial No. 2003-294295, filed in Japan Patent Office on Aug. 18, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical head for converging, upon an optical information medium, a beam of light for information recording or regeneration which is emitted from a laser light source, and for receiving the beam of light which is reflected from the optical information medium, the optical information medium having a disk shape and having a first portion and a second portion, the second portion being adjacent to the first portion in a radial direction, and the first portion having a different reflectance ratio than the second portion, the optical head comprising a sensor which detects a tilt or a positional shift of the optical information medium from a predetermined reference, said sensor including:

a substrate;

a light-source chip element which is disposed on said substrate and irradiates the optical information medium with a divergent beam of light; and a light-receiving region which is disposed on said substrate and receives the divergent beam of light emitted from said light-source chip element after being reflected by the optical information medium, wherein said light-receiving region is divided into a plurality of areas by a division line as a boundary which extends on said light-source chip, the plurality of areas being symmetrical with respect to the division line, and based on a ratio of a quantity of light which each of the areas receives, detects a tilt or a positional shift of the optical information medium, wherein the sensor is disposed so that the division line becomes substantially in parallel with a tangential direction of the optical information medium, wherein a cylindrical element is provided on an optical path between the optical information medium and said light-receiving region, wherein the divergent beam of light has a boundary between a bright part and a dark part reflected by the first portion and the second portion of the optical information medium, and transmits across the cylindrical element, and wherein said cylindrical element is placed in a position that a generating line thereof tilts with respect to the division line at an angle in a range of 40 to 50 degrees so that the boundary between the bright part and the dark part of the divergent beam of light transmitting across the cylindrical element turns about its optical axis at an angle of approximately 90 degrees with respect to the divergent beam of light before transmitting across the cylindrical element.

2. The optical head according to claim 1, wherein:
a concave portion is formed in the surface of said substrate; and
said light-source chip element is disposed in said concave portion.

3. The optical head according to claim 2, wherein said concave portion has a taper shape at a side surface thereof.

4. The optical head according to claim 1, wherein said light-source chip element is an LED element.

5. The optical head according to claim 1, wherein:
said substrate is made of a semiconductor; and
said light-source chip element is united with said substrate.

6. The optical head according to claim 1, wherein in said substrate, a circuit portion is provided which amplifies a photoelectric current from said light-receiving region and makes a calculation.

7. An optical-information medium driving device for recording information in an optical information medium or regenerating information recorded therein, the optical information medium having a disk shape and having a first portion and a second portion, the second portion being adjacent to the first portion in a radial direction, and the first portion having a different reflectance ratio than the second portion, the optical-information medium driving device comprising an optical head which emits a beam of light from a laser light source to the optical information medium and receives the beam of light which is reflected therefrom, said optical head including a sensor which detects a tilt or a positional shift of the optical information medium from a predetermined reference, said sensor including:

a substrate;

a light-source chip element which is disposed on said substrate and irradiates the optical information medium with a divergent beam of light; and a light-receiving region which is disposed on said substrate and receives the divergent beam of light emitted from said light-source chip element after being reflected by the optical information medium, wherein said light-receiving region is divided into a plurality of areas by a division line as a boundary which extends on said light-source chip, the plurality of areas being symmetrical with respect to the division line, and based on a ratio of a quantity of light which each of the areas receives, detects a tilt or a positional shift of the optical information medium, wherein the sensor is disposed so that the division line becomes substantially in parallel with a tangential direction of the optical information medium, wherein a cylindrical element is provided on an optical path between the optical information medium and said light-receiving region, wherein the divergent beam of light has a boundary between a bright part and a dark part reflected by the first portion and the second portion of the optical information medium, and transmits across the cylindrical element, and wherein said cylindrical element is placed in a position that a generating line thereof tilts with respect to the division line at an angle in a range of 40 to 50 degrees so that the boundary between the bright part and the dark part of the divergent beam of light transmitting across the cylindrical element turns about its optical axis at an angle of approximately 90 degrees with respect to the divergent beam of light before transmitting across the cylindrical element.

8. The optical head according to claim 1,
wherein the cylindrical element is formed with a through hole,
wherein the divergent beam of light emitted from the light-source chip element passes through the through hole, and
wherein the divergent beam of light reflected by the optical information medium transmits across the cylindrical element.

9. The optical-information medium driving device according to claim 7,
wherein the cylindrical element is formed with a through hole,
wherein the divergent beam of light emitted from the light-source chip element passes through the through hole, and
wherein the divergent beam of light reflected by the optical information medium transmits across the cylindrical element.

* * * * *